June 27, 1939. J. WING 2,163,862
HOLDER OR CONTAINER FOR DENTURES AND OTHER ARTICLES
Filed May 9, 1938
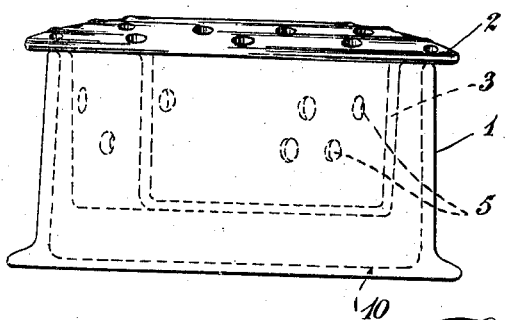
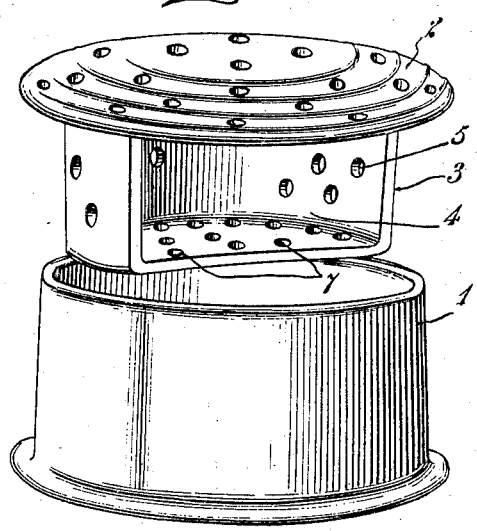
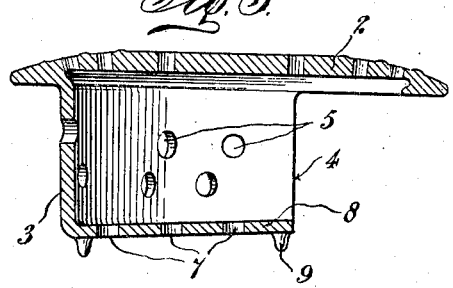
INVENTOR
Jack Wing
BY
ATTORNEY Patented June 27, 1939

2,163,862

UNITED STATES PATENT OFFICE 2,163,862

HOLDER OR CONTAINER FOR DENTURES AND OTHER ARTICLES

Jack Wing, South Woodford, England

Application May 9, 1938, Serial No. 206,935
In Great Britain November 3, 1936

1 Claim. (Cl. 206—1)

This invention relates to holders or containers which are provided with lids and more particularly although not exclusively to holders or containers for use in holding dentures and has for its object to provide an improved holder or container which facilitates the immersion of the denture or any desired article in any desired liquid and also the extraction of the said denture or other article when desired thereby avoiding to a considerable extent soiling the fingers on insertion or extraction of the denture or other article into or from any liquid in the holder or container. The present invention is hereinafter described in its application to a denture holder or container from which its application to other articles in general will be readily understood.

According to the present invention a holder or container for a denture or other article having a perforated or unperforated lid is provided wherein the lid carries a laterally gapped receptacle which is removable and replaceable with the lid and forms an integral part thereof or an attachment thereto. In a convenient form of the invention the lid, which may be perforated to allow for ventilation, carries a laterally gapped receptacle preferably having a perforated bottom. The receptacle may be integral with or rigidly and detachably connectible to the lid. The receptacle acts as a support for a denture or other article and if perforated also acts as a strainer the depth of the receptacle being such that the denture or other article can be immersed in any desired liquid in the holder or container when the lid is positioned thereon. The receptacle may be provided with a horizontally arranged bottom or floor or the said bottom or floor may be inclined downwardly and away from the edge of the lateral gap in order to hold or support the denture or other article more safely in position in the said receptacle. The wall or walls of the receptacle may be perforated, such perforation being in the form of slits and/or holes of circular or other suitable form. The lower face of the bottom or floor of the receptacle may be optionally provided with pips which may rest on the inner surface of the container or holder bottom. In such latter arrangement the container or holder would be of suitable depth for the purpose in order that the lid may rest on the holder or container or be slightly clear thereof.

The holder or container including the lid and the outer and/or inner wall of the receptacle may be of any suitable contour for example the holder or container itself may be circular, polygonal, square, rectangular or of other suitable contour the lid itself being shaped to suit or fit the shape of the holder or container. As regards the laterally gapped receptacle the outer wall and/or the inner wall thereof may be circular, polygonal, square, rectangular or of other suitable contour in cross sectional plan.

In order that the invention may be clearly understood and readily carried into effect reference is made to the accompanying drawing which shows diagrammatically and by way of example a construction of denture holder or container in accordance with the present invention. From the drawing and the following description the application of the holder or container for use with other articles may be readily understood.

Figure 1 is an elevation of a holder, or container having a lid and a receptacle carried therewith in accordance with the present invention.

Figure 2 is a perspective view showing the lid superposed above the holder or container and in position ready to be placed on top of the latter.

Figure 3 is a cross section of a modified form of lid or cover in accordance with the present invention.

Figure 4 is a perspective view showing a D shaped form of the holder and receptacle to a reduced scale.

Referring to the drawing 1 is a holder or container which may be of any suitable contour such as circular, polygonal, square or rectangular. 2 is a lid for the holder or container 1 the said lid being provided with a receptacle 3 which as shown in the drawing is conveniently formed as circular wall which is laterally gapped as at 4. The wall forming part of the receptacle 3 may be circular, polygonal, square, rectangular or of other suitable form. The wall is provided with perforations 5 which as shown in the drawing are of circular form and the floor or bottom 6 of the receptacle is also provided with perforations 7. The perforations 5 and 7 may however be in the form of slits instead of circular form as shown in the drawing or a combination of slits and other suitably shaped perforations may be used instead of the circular perforations shown. The receptacle 3 may be of any suitable depth and the holder or container including its lid and the receptacle may be of any suitable size depending on the size of the denture or other article to be placed in the receptacle 3. Further the gap 4 may be of any suitable depth and width.

In a modified form of lid shown in Figure 3 the floor or bottom 8 slopes in a downward direction away from the edge of the gap 4 in order to hold or retain the denture or other article in the receptacle 3 more effectively than when the inner lower surface of the receptacle is horizontally arranged. If desired however the inner bottom surface of the receptacle 3 may be inclined upwardly towards the lid. Further, the bottom outer surface of the receptacle may be provided with any desired number of pips 9 which may rest on the inner surface 10 of the holder or container in which arrangement the inner surface of the lid may rest on or be slightly above the upper edge of the holder or container 1. The lid itself may be perforated in order to admit air into the holder or container. A holder or container in accordance with the present invention may be used for treating dentures, articles of gold such as gold rings, chains and other articles or with other metals or alloys. The receptacle may be provided as a separate fitment to the lid as by a bayonet joint or by screws or by a screw-on joint.

The holder or container and/or its lid and the receptacle may be made of glass, china, earthenware, synthetic resin or any other desired material and if desired the lid instead of being loosely positioned on top of the holder or container may be a push in fit or may be adapted to screw thereon or screw thereinto as found most convenient. It should be clearly understood however that the receptacle to carry the denture or other article may be of any suitable and convenient shape.

Although the receptacle 3 is described and shown as being integral with the lid 2 the said receptacle may be detachably connected with the lid as by a bayonet joint or by an external or internal screw threaded or segmental screw threaded joint. It should be clearly understood that although pips such as 9 are shown in Figure 3 such illustration is merely for convenience. When pips are provided the depths of the receptacle and container or holder are such that the pips rest on the inner surface of the holder or container with the lid resting thereon or if desired clear thereof.

What I claim is:

A denture holder comprising a receptacle to contain a liquid cleaning medium, the receptacle being fully open at the upper end, a perforated removable cover therefor having a contour corresponding to that of the receptacle and perforated at various points throughout its full area, the diameter of the cover exceeding that of the receptacle so that the free edge of the cover materially overlies the upper edge of the receptacle, and a container carried by and depending from the cover, with a diameter materially less than that of the receptacle, the container being open throughout its full height and for a width corresponding approximately to the diameter of the container, said container being perforated in its bottom and side walls and having its bottom wall inclined downwardly from the edge of the container formed by the opening therein, the container when seated in the receptacle with the cover resting on the upper edge of the receptacle being freely open to circulation of any liquid in the receptacle through the bottom and side walls of the container and freely open to the admission of air through the openings in the cover, the inclined bottom of the container preventing accidental displacement of the article supported thereon.

JACK WING.